Sept. 30, 1958    W. R. CROOKS    2,854,187
SYSTEM FOR UNLOADING COMPRESSORS
Filed Dec. 15, 1953
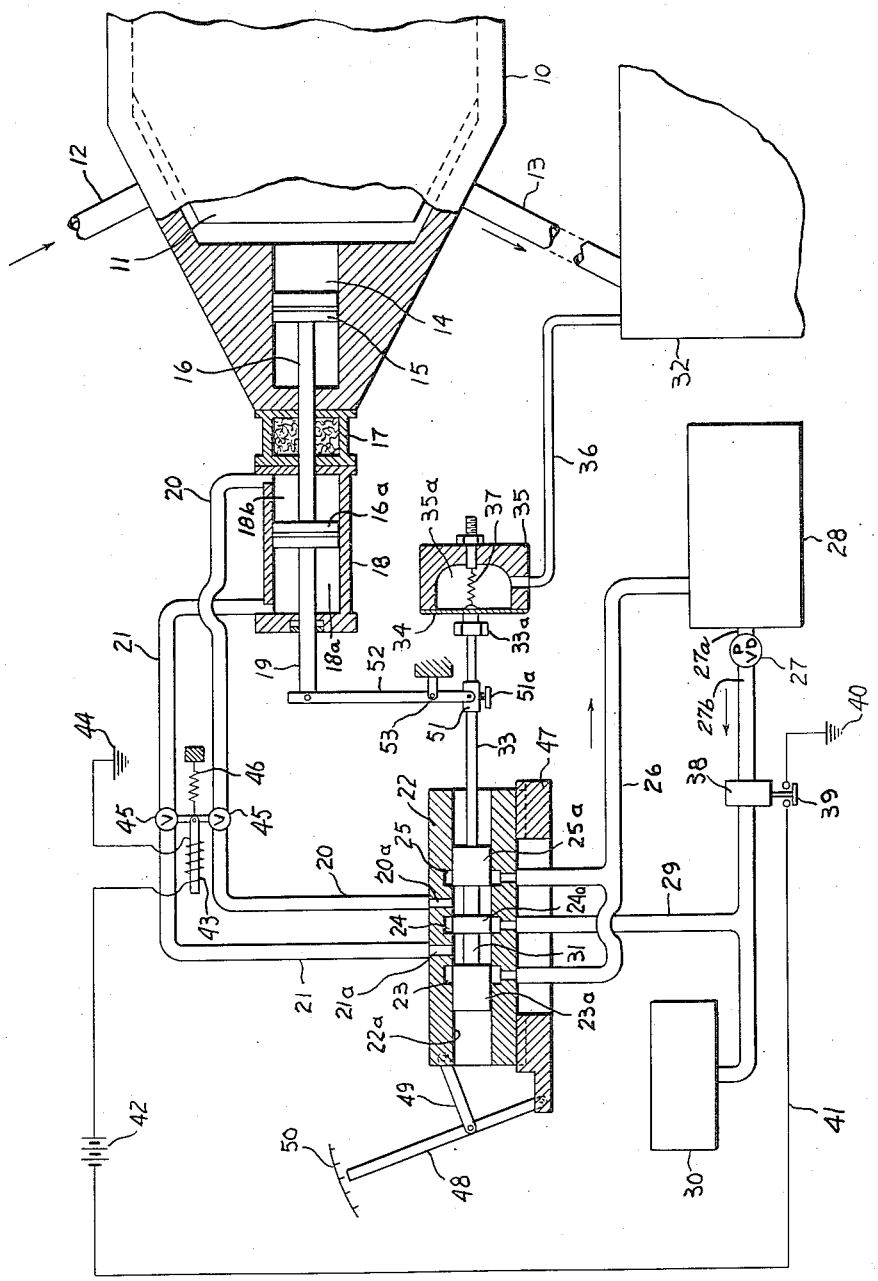
INVENTOR.
WILLIAM R. CROOKS
BY
Davis, Hoxie & Faithfull
ATTORNEYS 2,854,187

SYSTEM FOR UNLOADING COMPRESSORS

William R. Crooks, Mount Vernon, Ohio, assignor to The Cooper-Bessemer Corporation, Mount Vernon, Ohio, a corporation of Ohio Application December 15, 1953, Serial No. 398,255

3 Claims. (Cl. 230—21)

This invention relates to compressors and has particular reference to an improved system for unloading compressors of the reciprocating type.

Compressors of this type are commonly unloaded by increasing the volume of a clearance space in one end or head of the compressor cylinder, thereby lowering the capacity of the pump in terms of cubic feet per minute of the gas which is pumped, the other operating conditions being constant. The volume of this clearance space is usually adjusted by sliding a relatively small piston in a bore communicating with the main chamber in which the compressor piston reciprocates, so that the position of the smaller or unloading piston in its bore determines the capacity of the compressor. Heretofore, various systems have been proposed for adjusting the unloading piston automatically in accordance with changes in the load demand on the compressor, with a view to maintaining the compressor capacity more or less commensurate with the load demand. These prior systems, however, have numerous short-comings, among which are their failure to respond rapidly and positively to changes in the load demand, their inability to prevent spurious displacements of the unloading piston due to cyclical variations of pressure in the compressor cylinder (particularly during adjustment of the unloading piston in response to a change in the load demand), and the complexity of these systems.

The present invention has for its principal object the provision of an unloading control system which overcomes these objections to the prior systems. Further objects are to provide a control system of this type which can be readily adjusted to vary the pressure automatically maintained by the compressor for an industrial process, or the like; which can be easily converted from automatic to manual operation; and which embodies a safety feature for automatically preventing displacement of the unloading piston in the event of an accidental failure of the power source for operating the system.

A control system made according to the invention comprises a control cylinder containing a piston connected to the unloading piston, and a valve mechanism for regulating the flow of a hydraulic liquid to and from the spaces in this cylinder at the opposite ends of the control piston. The valve mechanism includes a valve operable in one position to connect one of these spaces to the high pressure side of a differential pressure (liquid) source while connecting the other space to the low pressure side, and in a second position to reverse these connections. Thus, in the first operating position of the valve, the control piston and the unloading piston are moved hydraulically in one direction to reduce the clearance space and therefore increase the compressor capacity, while in the second operating position of the valve these pistons are moved hydraulically in the opposite direction to reduce the compressor capacity. In a third position of the regulating valve, the two spaces at opposite ends of the control piston are disconnected from both sides of the differential pressure source, thereby locking this piston in the control cylinder and positively preventing displacement of the unloading piston by cyclical changes of pressure in the compressor cylinder. In either of the two operating positions of the valve, the unloading piston is held against displacement by such cyclical pressure changes, because the two spaces at opposite ends of the control piston are connected in a closed hydraulic circuit across the differential pressure source which actuates the control piston.

For automatic operation of the control system, the three-position valve is connected to a diaphragm or other device responsive to pressure changes in the discharge (or intake) line of the compressor. When the pressure in the discharge line falls below the desired value, reflecting an increase in the load on the compressor, the pressure-responsive device shifts the valve to its operating position in which the clearance space is reduced by hydraulic action on the control piston. When the resulting increased capacity of the compressor restores the desired pressure, the pressure-responsive device returns the valve to its third or non-operating position to lock the control and unloading pistons against further displacement. If the discharge pressure becomes too high, the regulating valve is moved to its other operating position to cause a reverse action to take place for restoring the desired pressure.

To guard against possible damage in the event of failure of the hydraulic pressure differential source, I provide safety valves in the connections between the control cylinder and the regulating valve, and means responsive to an excessively low hydraulic pressure at the source for closing these safety valves to prevent further displacement of the control or unloading pistons until the condition is corrected.

As a further feature of the invention, the control system is made adjustable to vary the pressure maintained by the compressor, which is desirable in many industrial applications where this pressure must be changed from time to time in response to changes in processing conditions, for example. In the preferred form of the new system, this adjustment is effected by varying the position of the regulating valve housing relative to its valve member which is moved by the pressure-responsive device.

To convert the new system from automatic to manual operation, I provide a releasable connection between the regulating valve and the pressure-responsive device, and means for establishing a direct follow-up connection between this valve and the control piston. Adjustment of the regulating valve housing relative to its valve can then be used to effect hydraulic re-positioning of the control and unloading pistons.

For a more complete understanding of the invention, reference may be had to the accompanying drawing, in which the single illustration is a schematic view of a preferred form of the new compressor unloader.

Referring to the drawing, the numeral 10 designates a compressor cylinder in which a piston 11 is reciprocated in any suitable manner. The compressor is provided with intake and discharge lines 12 and 13, respectively, communicating with the cylinder at one of its end portions through the usual check valves (not shown). It will be understood that when the compressor piston 11 moves to the right, as viewed in the drawing, the discharge line 13 is closed by its check valve while a fresh charge is drawn into the cylinder through the open check valve of the intake line 12, and when the piston moves in the opposite direction, the latter check valve is closed while the fluid charge is compressed and discharged through the open check valve of the discharge line 13, as is conventional in compressors of the reciprocating type.

In the same end of the compressor cylinder is an axial bore or sub-cylinder 14 of relatively small diameter which leads into the cylinder proper. The bore 14 contains a movable piston 15 and therefore forms a variable clearance section or space of the cylinder. Assuming that the reciprocations of the compressor piston 11 are constant in amplitude and frequency, the capacity of the compressor can be varied by changing the volume of the clearance space 14 through adjustment of the smaller piston 15, as is well-know in the art. Thus, an increase in this clearance space, by movement of piston 15 to the left, reduces the capacity of the compressor and unloads it; and the reverse effect is obtained by decreasing this clearance space through movement of piston 15 in the opposite direction.

The apparatus as described in detail above is conventional. The system for controlling the unloading or loading of the compressor through adjustment of the piston 15, and to which the present invention relates, will now be described in detail.

The piston 15 has a control rod 16 projecting through the adjacent end of the compressor cylinder 10. This control rod extends through a stuffing box 17 and into a control cylinder 18 mounted on the compressor. Within the cylinder 18 is a control piston 16a connected to the rod 16 and to a similar rod 19 extending through packing in the end of cylinder 18 remote from the compressor. The control piston 16a is exposed to a liquid, such as oil, filling the spaces 18a and 18b in the control cylinder at the opposite ends of the control piston. These spaces communicate with flexible tubes 20 and 21, respectively, extending from the opposite ends of the control cylinder 18 to a valve housing 22. The housing 22 has an axial bore 22a provided with three axially spaced, annular enlargements forming recesses 23, 24 and 25. The tube 20, which extends from the end of control cylinder 18 adjacent the compressor, communicates with a port 20a opening into the bore 22a through the land between the recesses 24 and 25. The other tube 21 communicates with a port 21a which opens into the bore 22a through the land between the recesses 23 and 24.

The two end recesses 23 and 25 of the valve housing are ported to branches of a flexible pipe 26 connected to the low pressure side 27a of a variable volume hydraulic pump 27, by way of a tank 28 for the oil or other hydraulic fluid. A flexible pipe 29 leads from the high pressure side 27b of pump 27 to the central recess 24 through a port in the valve housing. An accumulator 30 is connected to a branch of the high pressure pipe 29.

To vary the position of the control piston 16a, one end or the other of the cylinder 18 is connected to the high pressure pipe 29 while the opposite end is connected to the low pressure pipe 26. These connections are effected by means of a pilot valve 31 in the form of a valve spool slidable axially in the bore 22a. The pilot valve 31 has three axially spaced enlargements or lands 23a, 24a and 25a fitted closely in the bore 22a. When the valve 31 is centered in the housing 22, these lands completely cover the recesses 23, 24 and 25, respectively, as shown in the drawing, thereby blocking any flow of liquid in the tubes 20 and 21 connected to the control cylinder. Upon movement of valve 31 to the right from its centered position, the high pressure pipe 29 is connected between the lands 23 and 24a to tube 21 leading into the left end of cylinder 18, while the opposite end of this control cylinder is connected through tube 20 and the space between lands 24a and 25a to the low pressure pipe 26. Consequently, until the pilot valve 31 is returned to its central position, the clearance space 14 will be reduced in volume due to the admission of hydraulic liquid into the left end of cylinder 18 from its connection to pipe 29, and the withdrawal of a similar quantity of liquid from the opposite end of this cylinder into its connection to pipe 26, causing the pistons 16a and 15 to move to the right. Conversely, movement of pilot valve 31 to the left of its center position will reverse the previously described connections, so that the high pressure pipe 29 is now connected between the lands 24a and 25a to tube 20 while the other tube 21 is now connected between lands 23a and 24a to the low pressure pipe 26. The pistons 16a and 15 will then move to the left to increase the clearance space until the pilot valve is returned to its center position so as to break the hydraulic connections.

The pilot valve 31 of the valve mechanism 22–31 is responsive to changes in the load demand on the compressor 10. For example, it may be made to respond to changes in the pressure in a compressed gas tank 32 connected to the discharge line 13 of the compressor, so as to maintain the pressure substantially constant in spite of variations in the rate of withdrawal of compressed gas from this tank. For this purpose, I have shown the pilot valve 31 connected through a rod 33 to a flexible, spring-loaded diaphragm 34 by way of a releasable connection 33a, such as a nut. The diaphragm 34 is secured to a housing 35 so as to close one end of a chamber 35a in the housing. This chamber communicates with the compressed gas tank 32 through a pipe 36.

If the pressure in tank 32 drops below the desired value, the tension spring 37 draws the central part of diaphragm 34 to the right and thereby slides the pilot valve 31 to the right of its center position so as to admit hydraulic liquid to the left end of control cylinder 18 and withdraw liquid at the same rate from the opposite end. The resulting movement of pistons 16a and 15 to the right causes a reduction in the clearance space 14 and therefore an increase in the capacity of the compressor until the desired pressure is restored in tank 32, at which time the diaphragm returns the pilot valve 31 to its initial central position where it closes the hydraulic connections to control cylinder 18 and thereby locks the pistons 16a and 15 in their newly adjusted positions. If the gas pressure in tank 32 becomes too high, the diaphragm 34 and pilot valve 31 are moved to the left against the action of spring 37, thereby moving the pistons 16a and 15 hydraulically to the left. When the resulting decrease in the capacity of the compressor restores the desired pressure in tank 32, the diaphragm again returns the pilot valve to its central position so as to lock the pistons 16a and 15 hydraulically.

It will be apparent that the control system of the present invention automatically adjusts the capacity of the compressor to counteract any substantial change from the desired gas pressure in tank 32. The adjustments are effected promptly in response to these pressure changes, through the action of diaphragm 34 on the pilot valve. The unloading piston 15 is hydraulically locked in the positions to which it is adjusted, since the hydraulic liquid is positively prevented from flowing to or from either end of the control cylinder 18 when the pilot valve 31 is centered after an adjustment. In this way, the unloading piston 15 is held against displacements due to the cyclical fluctuations of pressure in the compressor cylinder 10 as the piston 11 reciprocates. Moreover, even during an adjustment of the compressor capacity (i. e., while pilot valve 31 is in one of its open positions), any appreciable cyclical displacements of the unloading piston are prevented due to the fact that the tubes 20 and 21 are connected across the pump 27 in a closed hydraulic circuit.

The accumulator 30 acts to eliminate hydraulic shock and enables rapid adjustment of the control piston 16a. The variable volume pump 27 provides a substantially constant differential between the pressures in pipes 26 and 29, this differential being sufficient to displace the pistons 16a and 15.

As a precautionary measure, I provide means for locking the pistons 16a and 15 against displacement in the event of failure of the hydraulic system. The safety means, as shown, comprise a pressure-responsive device 38, such as a Sylphon bellows, in the high pressure line 29, and a normally open switch 39 which is closed by the device 38 when the pressure in line 29 falls below a minimum value. One terminal of the switch is grounded, as shown at 40, and the other terminal is connected through wire 41 and current source 42 to one terminal of a solenoid 43, the other terminal of which is grounded at 44. The solenoid plunger is connected through suitable linkage to normally open valves 45 in the tubing 20 and 21, so that when the solenoid is energized the valves are closed against the action of a spring 46. Thus, the control piston 16a is locked in position by closing of valves 45 whenever the hydraulic pressure in line 29 becomes too low, so that the clearance space 14 is no longer under control of diaphragm 34. When the pressure is restored in line 29, the switch 39 and valves 45 are opened to place the systetm again under control of diaphragm 34.

In some industrial processes it is desirable to change, from time to time, the pressure to be maintained by the compressor, as in the tank 32. According to the present invention, I provide for such changes by making the valve housing 22 slidable on a fixed support 47, independently of the valve spool 31. As shown, the valve housing is slidable by a lever 48 pivoted at one end to the support 47 and connected intermediate its ends to housing 22 by a link 49. The free end of lever 48 is movable over a fixed scale 50 for indicating the pressure to be maintained in tank 32. By swinging lever 48 to the right, the housing 22 is moved to the right on its support 47, the flexible tubes 20, 21 and pipes 26, 29 permitting such movement. This connects the high and low pressure pipes 29 and 26 to the right and left ends, respectively, of control cylinder 18, so that pistons 16a and 15 are moved to the left to decrease the compressor capacity. The resulting decrease in the pressure in tank 32 causes diaphragm 34 and pilot valve 31 to move to the right until the valve is again centered in its housing, whereupon the control system operates as previously described to maintain the lower pressure in tank 32 as determined by the new position of lever 48. In a similar fashion, when lever 48 is swung to move housing 22 to the left relative to the valve spool 31, pistons 16a and 15 are moved to the right to increase the compressor capacity until the pressure rise in tank 32 recenters valve 31 in its housing, whereupon the control system operates to maintain the higher pressure determined by the new position of lever 48.

The lever 48 may be moved manually or automatically by a timer or other device (not shown), to vary the reference position of housing 22 and therefore the processing pressure to be maintained in tank 32.

To enable manual operation of the control system, in place of automatic operation through diaphragm 34, the latter is disconnected from the pilot valve by releasing the connection 33a, and a follow-up connection is established directly between this valve and the control piston 16a. The follow-up connection comprises a collar 51, which may be clamped to rod 33 by a releasable screw 51a, and a link 52. This link has a fixed fulcrum 53 intermediate its ends and is pivotally connected at its ends to the collar 51 and the outer end of rod 19 of the control piston, respectively. When housing 22 is moved to the right, for example, by manual operation of lever 48, the pistons 16a and 15 are moved hydraulically to the left to decrease the compressor capacity; and at the same time the pilot valve 31 is moved to the right through link 52 to re-center this valve in its housing and thereby lock the pistons 16a and 15 in their new positions. The position of lever 48 will thus determine the volume of the clearance space 14 and the compressor capacity. Automatic operation of the system may be restored by releasing the screw 51a and reestablishing the connection 33a.

I claim:

1. In a compressor having a main cylinder and a reciprocating piston therein, an unloading system comprising a sub-cylinder communicating with the main cylinder, an unloading piston slidable in the sub-cylinder to vary the capacity of the compressor, a hydraulic control cylinder and a control piston therein connected to the unloading piston, the control cylinder having liquid-receiving spaces at the opposite ends of the control piston, a source of differential hydraulic pressures having a high pressure outlet side and a low pressure inlet side, valve mechanism and piping connected between the spaces of the control cylinder and said source and including a movable housing member and a valve member movable therein, said members including throughflow openings so spaced that the valve member has three control positions relative to the housing member, namely, an operating position for making a connection from said high pressure side to only one of said spaces and a connection from said low pressure side to only the other of said spaces, a second operating position in which said connections are reversed, and a third position in which said connections are broken to lock the control and unloading pistons hydraulically, said valve mechanism, piping, source and spaces forming a closed and hermetically sealed hydraulic system having a liquid completely filling the system in each of said positions, means connected to one of said members of the valve mechanism for moving the same to make and break said connections, and a follow-up connection connecting the control piston and the other of said members.

2. In a compressor having a main cylinder and a reciprocating piston therein, an unloading system comprising a sub-cylinder communicating with the main cylinder, an unloading piston slidable in the sub-cylinder to vary the capacity of the compressor, a hydraulic control cylinder and a control piston therein connected to the unloading piston, the control cylinder having liquid-receiving spaces at the opposite ends of the control piston, a source of differential hydraulic pressures having a high pressure outlet side and a low pressure inlet side, valve mechanism and piping connected between the spaces of the control cylinder and said source and including a valve housing member and a valve member engaging the housing member and slidable relative thereto, said members including throughflow openings so spaced that the valve member has three control positions relative to the housing member, namely, an operating position for making a connection from said high pressure side to only one of said spaces and a connection from said low pressure side to only the other of said spaces, a second operating position in which said connections are reversed, and a third position in which said connections are broken to lock the control and unloading pistons hydraulically, said valve mechanism, piping, source and spaces forming a closed and hermetically sealed hydraulic system having a liquid completely filling the system in each of said positions, said piping including an hydraulic pipe line connecting said high pressure side to the valve mechanism, a pressure-responsive device in said pipe line, and means connected to said device and operable in response to a predetermined low pressure in said pipe line for hydraulically locking the control piston against displacement.

3. An unloading system according to claim 2, in which said locking means include normally open valves in said connections between the valve mechanism and the spaces of the control cylinder, and an electrical circuit operatively connected to the pressure responsive device for closing said last valves.

References Cited in the file of this patent

UNITED STATES PATENTS

| 2,004,474 | Schaer | June 11, 1935 |
| 2,197,158 | Saharoff | Apr. 16, 1940 |
| 2,761,615 | Prince | Sept. 4, 1956 |